United States Patent
Fraval

(10) Patent No.: US 12,491,991 B2
(45) Date of Patent: Dec. 9, 2025

(54) METHOD AND DEVICE FOR UNLOCKING A DOOR OF AN AIRCRAFT LANDING GEAR

(71) Applicant: SAFRAN LANDING SYSTEMS, Velizy-Villacoublay (FR)

(72) Inventor: Jérôme Fraval, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 18/689,679

(22) PCT Filed: Sep. 8, 2022

(86) PCT No.: PCT/EP2022/075038
§ 371 (c)(1),
(2) Date: Mar. 6, 2024

(87) PCT Pub. No.: WO2023/036897
PCT Pub. Date: Mar. 16, 2023

(65) Prior Publication Data
US 2024/0383600 A1    Nov. 21, 2024

(30) Foreign Application Priority Data
Sep. 9, 2021   (FR) ........................ 2109468

(51) Int. Cl.
*B64C 25/16*   (2006.01)
*B64C 25/28*   (2006.01)
*B64C 25/30*   (2006.01)

(52) U.S. Cl.
CPC .............. *B64C 25/16* (2013.01); *B64C 25/28* (2013.01); *B64C 25/30* (2013.01)

(58) Field of Classification Search
CPC ......... B64C 25/16; B64C 25/26; B64C 25/28; B64C 25/30; B64D 45/0005
See application file for complete search history.

(56) References Cited

U.S. PATENT DOCUMENTS

2012/0097792 A1   4/2012  Ernis et al.
2013/0075527 A1   3/2013  Lecourtier et al.
(Continued)

FOREIGN PATENT DOCUMENTS

| EP | 3575221 A1 | 12/2019 |
|---|---|---|
| EP | 3702272 A1 | 9/2020 |
| GB | 2585065 A | 12/2020 |

OTHER PUBLICATIONS

International Search Report for PCT/EP2022/075038 dated Nov. 30, 2022 (PCT/ISA/210).

*Primary Examiner* — Joshua J Michener
*Assistant Examiner* — Colin Zohoor
(74) *Attorney, Agent, or Firm* — Sughrue Mion, PLLC

(57) ABSTRACT

A method for unlocking a door of an aircraft landing gear movably mounted between an open position and a closed position includes, during a first sequence of opening the door that is locked in the closed position by a first attachment housing and a second attachment housing, controlling a first unlocking actuator to deactivate the first attachment housing, waiting a first waiting time greater than a time necessary for the door to initiate a passage from the closed position to the open position, so as to enable a detector to detect the door starting to open, detecting the door starting to open by the detector and whether there is a failure of the second attachment housing, and controlling a second unlocking actuator to deactivate the second attachment housing.

10 Claims, 4 Drawing Sheets

(56) References Cited

U.S. PATENT DOCUMENTS

2018/0362151 A1* 12/2018 Marles .................... B64C 25/16
2020/0055592 A1*  2/2020 Rowlands ............... B64C 25/26
2022/0324556 A1* 10/2022 Albarello ................ B64C 25/16

* cited by examiner

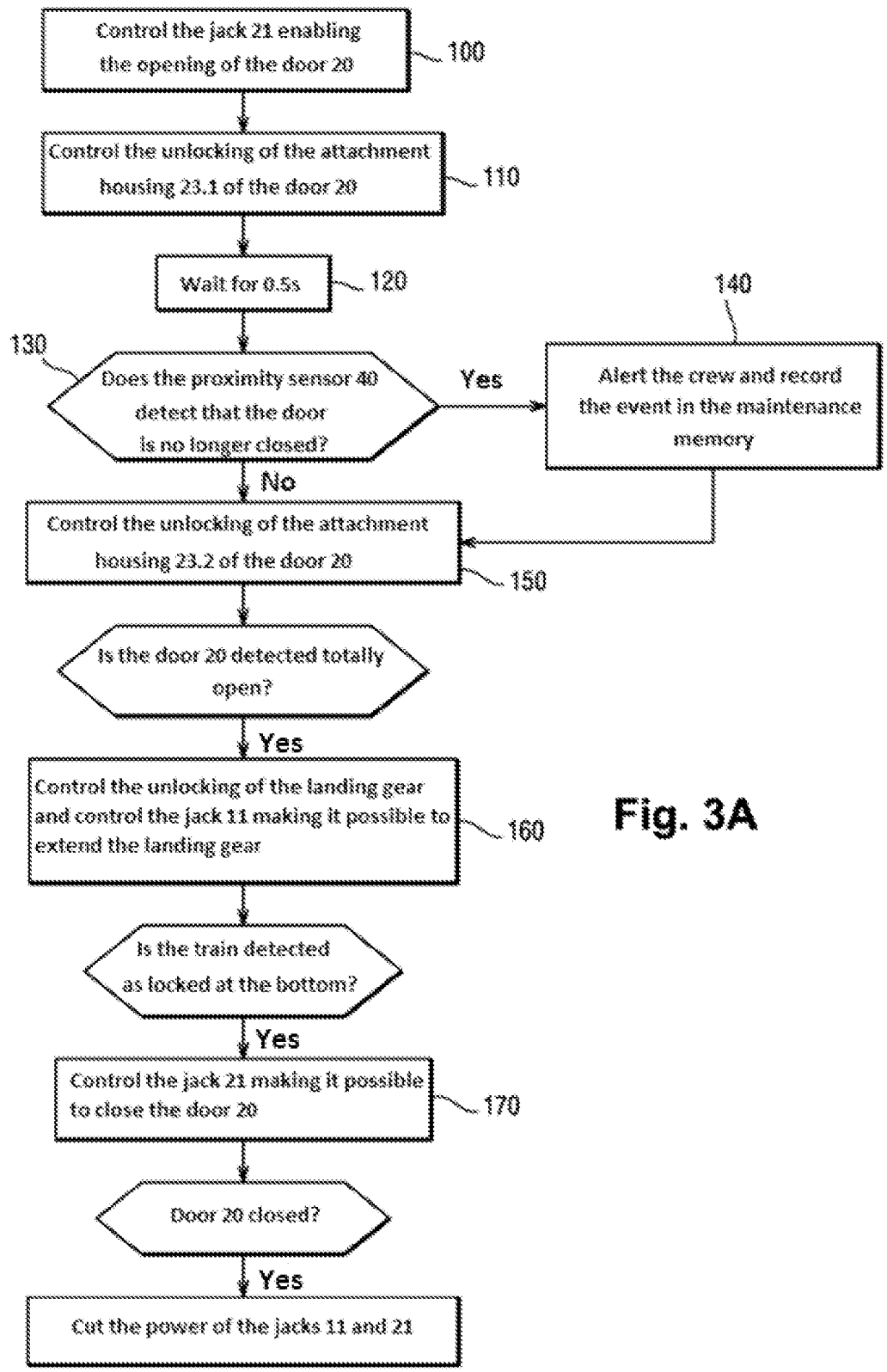

METHOD AND DEVICE FOR UNLOCKING A DOOR OF AN AIRCRAFT LANDING GEAR

CROSS REFERENCE TO RELATED APPLICATIONS

This application is a National Stage of International Application No. PCT/EP2022/075038 filed Sep. 8, 2022, claiming priority based on French Patent Application No. 2109468 filed Sep. 9, 2021, the contents of each of which being herein incorporated by reference in their entireties.

The present invention relates to the locking and unlocking of a door, in particular an aircraft landing gear door.

BACKGROUND OF THE INVENTION

Aircraft provided with retractable landing gears are known, with holds intended to receive these landing gears when the aircraft is in flight, and with doors for closing these holds. The deployment and the retraction of the landing gears, just like the opening and the closing of the doors, are done using operating actuators such as jacks.

When the landing gear arrives in the retracted position, it is automatically held in this position by retaining means. Similarly, when the door arrives in the closed position, it is automatically locked in this position by attachment means which generally comprise one single attachment housing on which a hook articulates, intended to confine a roller fixed on the door. The unhooking of the hook is done using a principal unlocking actuator, most often hydromechanical or electromechanical. The attachment means often comprise an emergency actuator able to unlock the hook if the principal actuator is inoperative.

In flight, the unhooking of the hook and the opening and the closing of the door are controlled during deployment and retraction sequences of the landing gear. It must be noted that the door is closed again and hooked when the landing gear is retracted, but also once it has been deployed.

This type of architecture makes it possible to prevent any unintentional deployment of the landing gear in case of failure of its retaining means, on the condition that the door and its attachment means are sized to ensure the holding of the landing gear under this type of load.

According to regulation CS-25 ("Certification Specifications for Large Aeroplanes"), it is necessary to classify the sole attachment housing equipping the door as a principal structural element (PSE), in order to ensure that no simple breakdown of the attachment housing can lead to an event tending to damage the overall structural integrity of the aircraft.

Yet, such a classification leads to consequences on the design of the attachment housing, its manufacturing method, the nature of the materials which compose it, but also its integration in the aircraft to be able to be visually inspected in order to detect possible anomalies, such as cracks.

AIM OF THE INVENTION

The invention aims to propose a solution overcoming, at least partially, the abovementioned disadvantages.

SUMMARY OF THE INVENTION

To this end, a method for unlocking a door of an aircraft landing gear movably mounted between an open position and a closed position is proposed, the door being associated with attachment means comprising a first attachment housing and a second attachment housing arranged to individually lock the door in the closed position, a first unlocking actuator and a second unlocking actuator arranged to respectively control the first attachment housing and the second attachment housing with a view to deactivating them, and means for detecting the door in the closed position.

According to the invention, the method comprises, during a first sequence of opening the door locked in the closed position by the first attachment housing and the second attachment housing, the following steps:
controlling the first unlocking actuator to deactivate the first attachment housing;
waiting a first waiting time greater than the time necessary for the door to initiate its passage from the closed position to the open position so as to enable the detection means to detect the door possibly starting to open;
detecting the door possibly starting to open by the detection means and deducing from this, if necessary, a failure of the second attachment housing;
controlling the second unlocking actuator to deactivate the second attachment housing.

It is understood that the offset actuation of the attachment housings makes it possible to test that the attachment housing actuated last actually serves its purpose during the duration of the waiting time. It is thus considered that this attachment housing is operational.

Advantageously, the method comprises, during a second sequence of opening the door locking in the closed position by the first attachment housing and the second attachment housing, the following steps:
controlling the second unlocking actuator to deactivate the second attachment housing;
waiting a second waiting time greater than the time necessary for the door to initiate its passage from the closed position to the open position so as to enable the detection means to detect the door possibly starting to open;
detecting the door possibly starting to open by the detection means and deducing from this, if necessary, a failure of the first attachment housing; and
controlling the first unlocking actuator to deactivate the first attachment housing.

According to a particular feature, the first sequence of opening the door corresponds to a retraction of the landing gear after a take-off, and the second sequence of opening the door corresponds to a deployment of the landing gear before a landing.

According to another particular feature, the first sequence and the second sequence of opening the door are done on the ground.

Particularly, the method further comprises the step of recording, in an aircraft maintenance memory, the failure of the first attachment housing and/or of the second attachment housing, and of informing the pilot of the aircraft about this.

Particularly, the first instant and the second waiting time are identical and substantially equal to 0.5 seconds.

The invention also relates to a device for unlocking a door of an aircraft landing gear. The device comprises attachment means comprising a first attachment housing and a second attachment housing arranged to lock the door in the closed position, a first unlocking actuator and a second unlocking actuator arranged to respectively control the first attachment housing and the second attachment housing with a view to deactivating them, the means for detecting the door in the closed position, and a control unit arranged to use such a method.

Particularly, the detection means comprise at least one proximity sensor.

The invention also relates to an aircraft provided with such a device.

BRIEF DESCRIPTION OF THE DRAWINGS

The invention will be best understood in the light of the description below, which is purely illustrative and non-limiting, and must be read regarding the accompanying figures, among which:

FIG. 3A illustrates a method for unlocking the door illustrated in FIG. 1, during a deployment sequence of the landing gear;

DETAILED DESCRIPTION OF THE INVENTION

Figure 1:
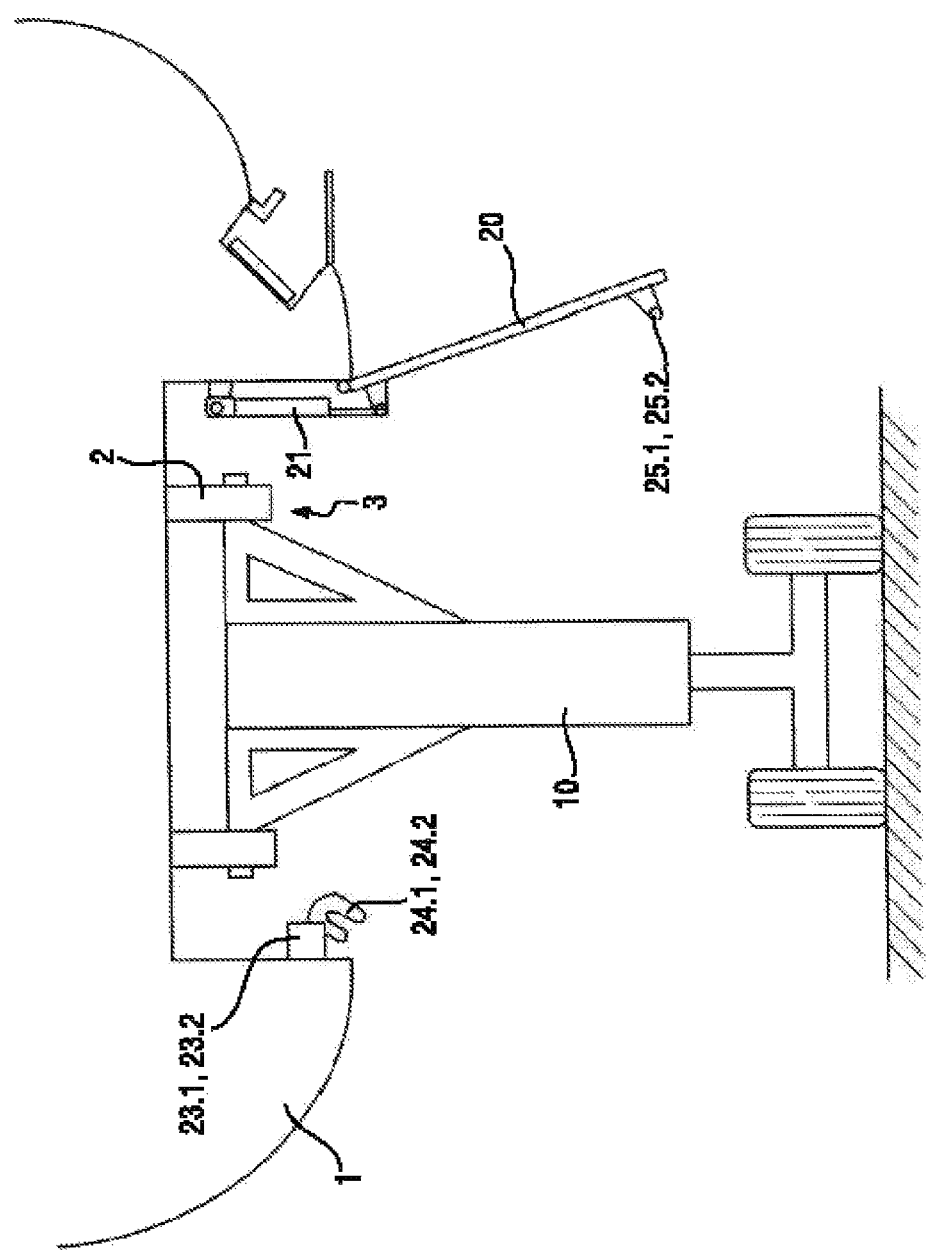
FIG. 1 is a schematic view of a locking device, according to a particular embodiment of the invention, of a door of an aircraft landing gear.

As illustrated in FIG. 1, the invention is described, in this case, in relation to an aircraft 1 comprising a landing gear 10 articulated on a structure 2 of the aircraft 1 between a deployed position illustrated in this case, and a retracted position, wherein the landing gear 10 is received in a hold 3 closable by a door 20.

Figure 2:
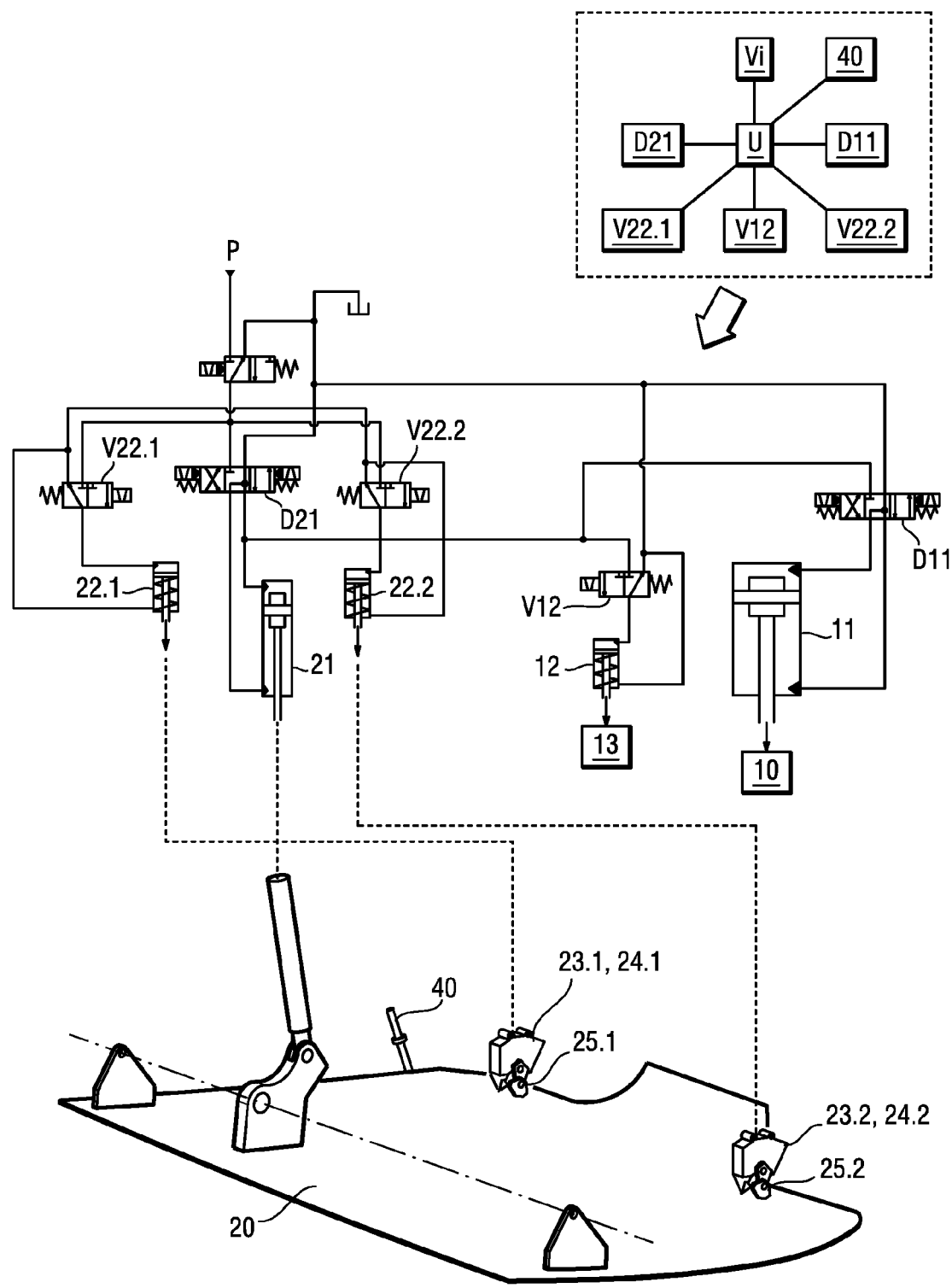
FIG. 2 illustrates a method for unlocking the door illustrated in FIG. 1, during a retraction sequence of the landing gear.

In reference to FIG. 2, a dual effect jack 11 is coupled to the landing gear 10 and makes it possible to move it between the retracted position and the deployed position. The landing gear 10 is held in the retracted position by one single attachment housing 13 provided with a hook making it possible to hook a tapped nut integral with the landing gear 10 when the latter arrives in the retracted position. The unhooking of the hook is controlled by a hydromechanical unlocking actuator 12.

Similarly, the dual effect jack 21 is coupled to the door 20 and makes it possible to move it between an open position enabling the deployment and the retraction of the landing gear, and a closed position closing the hold 3. The door 20 is held in the closed position by a first attachment housing 23.1 and a second attachment housing 23.2, both integral with the structure of the aircraft 1. The first attachment housing 23.1 is provided with a hook 24.1 making it possible to hook a first tapped nut 25.1 integral with the door 20 when said door 20 arrives in the closed position. The second attachment housing 23.2 is provided with a hook 24.2 making it possible to hook a second tapped nut 25.2 integral with the door 20 when said door 20 arrives in the closed position. It will be understood that the first attachment housing 23.1 makes it possible to hold the door 20 in the closed position independently from the second attachment housing 23.2, and vice versa. The first attachment housing 23.1 and the second attachment housing 23.2 are identical, in this case, just like the first tapped nut 25.1 and the second tapped nut 25.2.

The unhooking of the hook 24.1 equipping the first attachment housing 23.1 is controlled by a first hydromechanical unlocking actuator 22.1. Similarly, the unhooking of the hook 24.2 equipping the second attachment housing 23.2 is controlled by a second hydromechanical unlocking actuator 22.2. The first and second unlocking actuators 22.1, 22.2 are identical, in this case.

The jack 11 serving to move the landing gear 10 is controlled by a monostable distributor D11 connected to a pressurised fluid source P. The actuator 12 making it possible to deactivate the attachment housing 13 is controlled by a monostable valve V12 connected to the pressurised fluid source P.

The jack 21 serving to move the door 20 is controlled by a monostable distributor D21 connected to the pressurised fluid source P. The first actuator 22.1 making it possible to deactivate the first attachment housing 23.1 is controlled by a first monostable valve V22.1 connected to the pressurised fluid source P. Similarly, the second actuator 22.2 making it possible to deactivate the second attachment housing 23.2 is controlled by a second monostable valve V22.2 connected to the pressurised fluid source P.

A monostable isolation valve Vi makes it possible to isolate, in particular during certain flight phases, the distributors D11, D21 and the control valves V12, V22.1, V22.2 of the pressurised fluid source P, in order to limit the unintentional deployment and retraction of the landing gear 10, but also the unintentional opening and closing of the door 20.

It will be noted that, in case of failure of the attachment housing 13, the landing gear 10 would, despite it all, be retained in the hold 3 by the door 20 locked in the closed position via the first attachment housing 23.1 and the second attachment housing, such that the locking of the door 20 tends to limit any unintentional deployment of the landing gear 10.

The aircraft 1 also comprises a control unit U arranged to control the distributors D21, D22 connected to the jacks 11, 21 and the valves V12, V22.1, V22.2 connected to the actuators 12, 22.1, 22.2, so as to control the deployment and the retraction of the landing gear 10, the locking of said landing gear 10 in the retracted position, the opening and the closing of the door 20, and the locking of the door in the closed position.

The aircraft 1 further comprises a proximity sensor 40 of the inductive type connected to the control unit U and arranged to detect the presence of the door 20 in the closed position, and therefore able to show said door 20 starting to be opened until a state of the door 20 not being closed.

In order to verify the integrity of the first attachment housing 23.1 and of the second attachment housing 23.2, and thus provide against a latent breakdown of it, the control unit U is arranged to use a method for unlocking the door 20 of the landing gear 10.

Figure 3B:
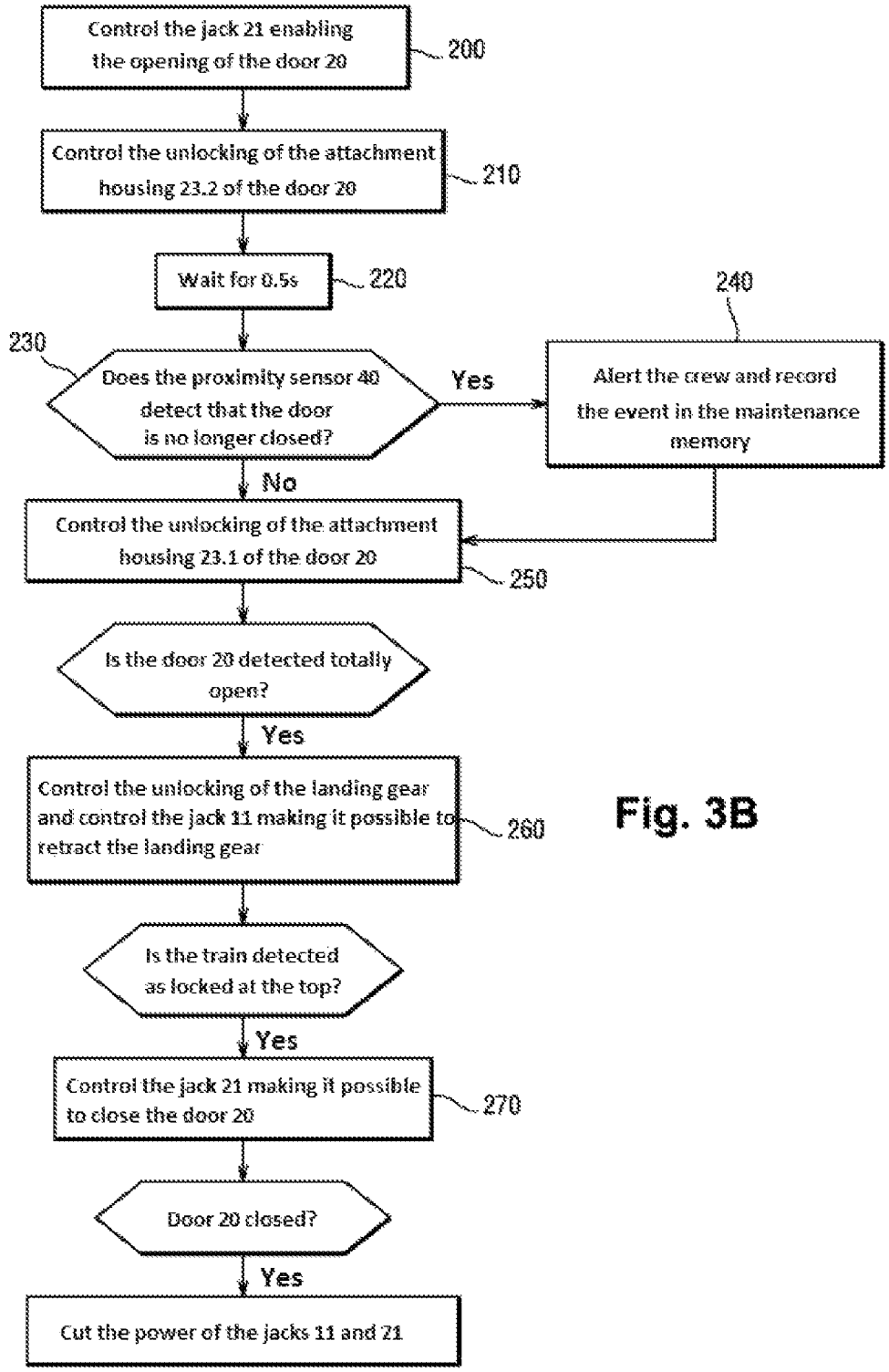
FIG. 3B illustrates a method for unlocking the door illustrated in FIG. 1, during a retraction sequence of the landing gear.

According to the invention, the method comprises, during a sequence of retracting the landing gear 10 after a take-off, the following steps (FIG. 3A):

controlling the jack 21 via the distributor D21 to open the door 20 (step 100);

controlling the first unlocking actuator 22.1 via the valve V22.1 to deactivate the first attachment housing 23.1 (step 110);

waiting a first waiting time Tl greater than the time necessary for the door 20 to initiate its passage from the closed position to the open position so as to enable the proximity sensor 40 to detect the door 20 possibly starting to open (step 120);

detecting the door 20 possibly starting to open by the proximity sensor 40 (step 130) and deducing from this, if necessary, a failure of the second attachment housing 23.2 which will be recorded in a maintenance memory of the aircraft 1 and returned to the pilot of the aircraft 1 (step 140);

controlling the second unlocking actuator 22.2 via the valve V22.2 to deactivate the second attachment housing 23.2 (step 150);

when the door 20 arrives in the open position, controlling the unlocking actuator 12 of the landing gear 10 via the valve V12 and controlling the jack 11 to retract said landing gear 10;

when the landing gear 10 arrives in the retracted position, controlling the jack 21 via the distributor D21 to close the door 20 (step 160); and when the door arrives in the closed position, cutting the power of the jacks 11, 21 and of the unlocking actuators 12, 22.1, 22.2 via the isolation valve Vi (step 170).

The method also comprises, during a sequence of deploying the landing gear 10 before a landing, the following steps (FIG. 3B):

controlling the jack 21 via the distributor D21 to open the door 20 (step 200);

controlling the second unlocking actuator 22.2 via the vale V22.2 to deactivate the second attachment housing 23.2 (step 210);

waiting a second waiting time T2 greater than the time necessary for the door 20 to initiate its passage from the closed position to the open position so as to enable the proximity sensor 40 to detect the door 20 possibly starting to open (step 230);

detecting the door 20 possibly starting to open by the proximity sensor 40 and deducing from this, if necessary, a failure of the first attachment housing 23.1 which will be recorded in the maintenance memory and returned to the pilot of the aircraft 1 (step 240);

controlling the first unlocking actuator 22.1 via the valve V22.1 to deactivate the first attachment housing 23.1 (step 250);

when the door 20 arrives in the open position, controlling the jack 11 to deploy the landing gear 10;

when the landing gear 10 arrives in the deployed position, controlling the jack 21 via the distributor D21 to close the door 20 (step 260); and when the door arrives in the closed position, cutting the power of the jacks 11, 21 and of the unlocking actuators 12, 22.1, 22.1 via the isolation valve Vi (step 270).

The first waiting time T1 and the second waiting time T2 are identical, in this case, and substantially equal to 0.5 seconds.

It will be understood that such a method makes it possible to alternatively test the correct operation of the first housing 23.1 and of the second unlocking housing 23.2 over each complete flight cycle of the aircraft 1.

The correct operation of the first housing 23.1 and of the second unlocking housing 23.2 can also be tested on the ground, in particular when the aircraft 1 is parked. The method thus comprises the following steps:

during a first sequence of opening the door 20:
controlling the jack 21 via the distributor D21 to open the door 20;
controlling the first unlocking actuator 22.1 via the valve V22.1 to deactivate the first attachment housing 23.1;
waiting for the waiting time T1 so as to enable the proximity sensor 40 to detect the door 20 possibly starting to open;
detecting the door 20 possibly starting to open by the proximity sensor 40 and deducing from this, necessary, a failure of the second attachment housing 23.2 which will be recorded in the maintenance memory and returned to the pilot of the aircraft 1;
controlling the second unlocking actuator 22.2 via the valve V22.2 to deactivate the second attachment housing 23.2;
when the door 20 arrives in the open position, controlling the jack 21 via the distributor D21 to close the door 20;

during a second sequence of opening the door 20:
controlling the jack 21 via the distributor D21 to open the door 20;
controlling the second unlocking actuator 22.2 via the valve V22.2 to deactivate the second attachment housing 23.2;
waiting for a waiting time T2 so as to enable the proximity sensor 40 to detect the door 20 possibly starting to open;
detecting the door 20 possibly starting to open by the proximity sensor 40 and deducing from this, if necessary, a failure of the first attachment housing 23.1 which will be recorded in the maintenance memory and returned to the pilot;
controlling the first unlocking actuator 22.1 via the valve V22.1 to deactivate the first attachment housing 23.1;
when the door 20 arrives in the open position, controlling the jack 21 via the distributor D21 to close the door 20.

Verifying the correct operation of the first housing 23.1 and of the second unlocking housing 23.2 can also be done on the ground by an operator, manually and alternatively deactivating the first and second attachment housings 23.1, 23.2 to release the door 20.

Naturally, the invention is not limited to the embodiment described, but includes any variant entering into the field of the invention such as defined by the claims.

Although, in this case, the first and second attachment housings 23.1, 23.2 are identical, they can be different.

Although, in this case, the first and second unlocking actuators 22.1, 22.2 are hydromechanical, they can be of a different nature (electromechanical, etc.).

Although, in this case, the waiting times T1 and T2 are identical, they can be different: the waiting time T1 can be greater than the waiting time T2, or vice versa.

Although, in this case, the detection of the door 20 in the closed position is ensured by a proximity sensor 40, other detection means can be considered (contact sensor, etc.).

The invention claimed is:

1. A method for unlocking a door of an aircraft landing gear movably mounted between an open position and a closed position, the door being associated with an attachment means comprising a first attachment housing and a second attachment housing arranged to individually lock the door in the closed position, a first unlocking actuator and a second unlocking actuator arranged to respectively control the first attachment housing and the second attachment housing to deactivate by disengaging or disconnecting the first attachment housing and the second attachment housing from the door, and detection means for detecting the door in the closed position, the method comprising, during a first sequence of opening the door that is locked in the closed position by the first attachment housing and the second attachment housing:

controlling the first unlocking actuator to deactivate the first attachment housing;

waiting a first waiting time greater than a time necessary for the door to initiate a passage from the closed position to the open position, so as to enable the detection means to detect the door starting to open;

detecting the door starting to open by the detection means and whether there is a failure of the second attachment housing; and controlling the second unlocking actuator to deactivate the second attachment housing.

2. The method according to claim 1, further comprising, during a second sequence of opening the door that is locked in the closed position by the first attachment housing and the second attachment housing:

controlling the second unlocking actuator to deactivate the second attachment housing;

waiting a second waiting time greater than the time necessary for the door to initiate the passage from the closed position to the open position, so as to enable the detection means to detect the door starting to open;

detecting the door starting to open by the detection means and determining whether there is a failure of the first attachment housing; and controlling the first unlocking actuator to deactivate the first attachment housing.

3. The method according to claim 2, wherein the first sequence of opening the door corresponds to a retraction of the landing gear after a take-off, and the second sequence of opening the door corresponds to a deployment of the landing gear before a landing.

4. The method according to claim 2, wherein at least one of the first sequence and second sequence of opening the door is done on the ground.

5. The method according to claim 2, further comprising recording, in a maintenance memory of the aircraft, the failure of the first attachment housing and/or of the second attachment housing, and notifying the pilot of the aircraft about the failure.

6. The method according to claim 2, wherein the first waiting time and the second waiting time are identical and equal to 0.5 seconds.

7. A device for unlocking a door of an aircraft landing gear, the device comprising:

attachment means comprising a first attachment housing and a second attachment housing arranged to lock the door in the closed position;

a first unlocking actuator and a second unlocking actuator arranged to respectively control the first attachment housing and the second attachment housing to deactivate by disengaging or deactivating the first attachment housing and the second attachment housing from the door;

detection means for detecting the door in the closed position; and a control unit configured to perform a method comprising, during a first sequence of opening the door that is locked in the closed position by the first attachment housing and the second attachment housing:

controlling the first unlocking actuator to deactivate the first attachment housing;

waiting a first waiting time greater than a time necessary for the door to initiate a passage from the closed position to the open position, so as to enable the detection means to detect the door starting to open;

detecting the door starting to open by the detection means and whether there is a failure of the second attachment housing; and controlling the second unlocking actuator to deactivate the second attachment housing.

8. The device according to claim 7, wherein the detection means comprises at least one proximity sensor.

9. An aircraft comprising:

a hold which is closed by a door and which receives a landing gear; and the device according to claim 7, wherein the device is associated with the door.

10. A device for unlocking a door of an aircraft landing gear, the device comprising:

an emergency actuator comprising a first attachment housing and a second attachment housing arranged to lock the door in the closed position;

a first unlocking actuator and a second unlocking actuator arranged to respectively control the first attachment housing and the second attachment housing to deactivate by disengaging or disconnecting the first attachment housing and the second attachment housing from the door;

at least one proximity sensor that detects the door in the closed position; and a controller that, during a first sequence of opening the door that is locked in the closed position by the first attachment housing and the second attachment housing:

controls the first unlocking actuator to deactivate the first attachment housing;

waits a first waiting time greater than a time necessary for the door to initiate a passage from the closed position to the open position, so as to enable the at least one proximity sensor to detect the door starting to open;

control the at least one proximity sensor to detect the door starting to open and whether there is a failure of the second attachment housing; and controls the second unlocking actuator to deactivate the second attachment housing.

* * * * *